May 22, 1923.
E. C. GRASSMAN
1,456,305
SAFETY CLASP FOR JEWELRY
Filed Dec. 2, 1922.
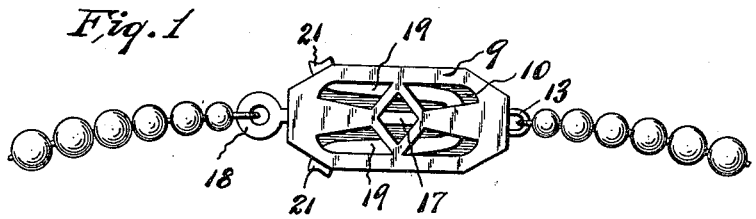
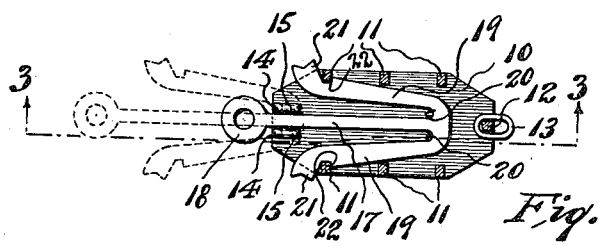
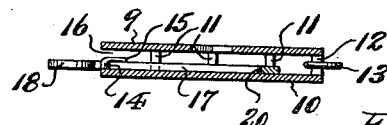
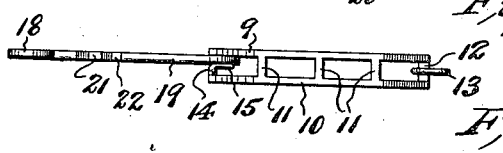
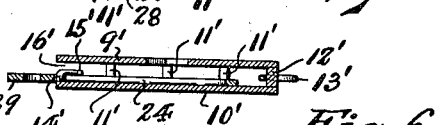
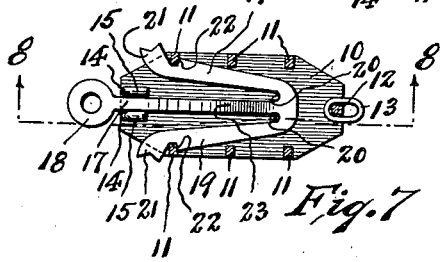
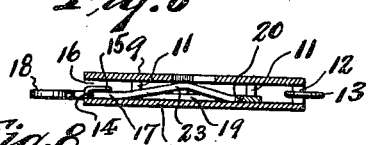
INVENTOR.
Edward C. Grassman
BY
Frautzel and Richards
ATTORNEYS.

Patented May 22, 1923.

1,456,305

UNITED STATES PATENT OFFICE.

EDWARD C. GRASSMAN, OF NEWARK, NEW JERSEY, ASSIGNOR TO HARRY C. SCHICK, INC., A CORPORATION OF NEW JERSEY.

SAFETY CLASP FOR JEWELRY.

Application filed December 2, 1922. Serial No. 604,470.

*To all whom it may concern:*

Be it known that I, EDWARD C. GRASSMAN, a citizen of the United States, residing at Newark, in the county of Essex and State of New Jersey, have invented certain new and useful Improvements in Safety Clasps for Jewelry; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in safety clasps or fasteners for jewelry, such as necklaces, bracelets and similar articles.

The invention has for its principal object to provide a novel construction of safety clasp or fastener, which is neat in appearance, very easy to manipulate both when fastening and unfastening the same, and which is further provided with separable elements having an auxiliary guard means adapted to prevent complete separation of said elements should the same become accidentally disengaged from their normal mutually interlocked relation.

The invention has for a further object to provide a clasp or fastener comprising separable male and female elements combined with a safety guard means so arranged as not to interfere with the direct longitudinal or endwise thrust of the male element relative to the female element when fastening or unfastening the clasp, thus greatly simplifying the mode of manipulating the clasp.

Other objects of this invention, not at this time more particularly enumerated, will be clearly understood from the following detailed description of the same.

With the various objects of the invention in view, the same consists, primarily, in the novel clasp or fastener with safety guard attachment hereinafter set forth; and, the invention also consists in the novel arrangements and combinations of the various devices and parts, as well as in the details of the construction of the same, all of which will be hereinafter more fully described, and then finally embodied in the appended claims.

The invention is clearly illustrated in the accompanying drawings, in which:—

Figure 1 is a face view of the novel clasp or fastener with the elements in normal interlocked relation, the same showing one embodiment of my invention; Figure 2 is a horizontal section through the same, the male element being shown in normal interlocked relation to the female element by full lines, and shown in disengaged relation to the female element but caught by the safety guard attachment to prevent complete separation by the dotted lines; Figure 3 is a longitudinal vertical section, taken on line 3—3 in Figure 2; and Figure 4 is a side elevation, showing the male element passing the guard devices when the same is directly thrust in longitudinal or endwise direction into the female element. Figure 5 is a horizontal section showing a modified form of male element and safety guard device; and Figure 6 is a vertical longitudinal section through the same, taken on line 6—6 in said Figure 5. Figure 7 is another horizontal section, showing another modified form of male element; and Figure 8 is a vertical longitudinal section through the same, taken on line 8—8 in said Figure 7.

Similar characters of reference are employed in all of the hereinabove described views, to indicate corresponding parts.

Referring now to said drawings, and more especially to Figures 1 to 4 inclusive, the novel safety clasp or fastener comprises a female element consisting of a face or front plate 9 and a back plate 10 arranged one over the other in parallel alined relation and spaced apart to provide an intermediate space or chamber. Said face or front plate and said back-plate are secured together in such relation one to the other by a plurality of vertical posts 11 or other equivalent means which interconnect the longitudinal side margins of the respective plates together. The rear ends of the plates 9 and 10 may also be further joined together by a vertical post 12 to which may be secured a link 13 with which may be connected one end of a necklace, chain, bracelet or the like; or any other suitable means for connecting such articles to the rear end of the female element may be provided. Connected with the inner side of the back plate 10 adjacent to the forward end, so as to be situated within the forward open end of the space intermediate the plates 9 and 10, are a pair of guard hooks 14 laterally spaced apart but centrally located intermediate the side margins of said backplate. The upper free ends of said guard hooks 14 terminate in inwardly directed longitudinal arms 15, the tops of which are spaced away from the inner side of the face or front plate 9 so as to provide a free unobstructed way or passage 16, intermediate said guard hooks and said face or front plate, leading into the space intermediate the plates 9 and 10. In one form, as illustrated in Figures 1 to 4 inclusive, the separable male element of the clasp or fastener comprises a longitudinal bar 17 having at its outer end an eye-member or ring 18 with which may be connected the opposite end of a necklace, chain, bracelet or the like. Connected with the opposite or free end of said bar 17, so as to extend forwardly along each side thereof, are laterally diverging and resilient arms 19 which together with the bar provide U-shaped portions 20 at the free end of the latter. The free end of each arm 19 is provided with a laterally and outwardly turned portion 21 constituting finger pieces. Each arm is provided at its outer edge to the rear of the finger piece with a catch-notch or indention 22.

From the above description it will be evident that the female element consists essentially of a box-like structure having an opening in its forward end giving access to the interior thereof, and that the male element is adapted for insertion through said open end into the interior space of the female element, said male and female elements having mutually cooperating parts for interlocking the same together in normal fastened relation, and said female element having auxiliary guard hooks for catching and holding the male element against complete separation from the female element should the mutually interlocked parts become accidentally disarranged, said guard hooks being so disposed and constructed as not to interfere with the direct end-wise thrust of the male element through the open end of and into the female element.

In operation, to fasten the clasp, the free end of the male element is thrust through the unobstructed way or passage 16 above the guard hooks 14 into the interior of the female element, until the U-shaped portions 20 pass beyond the ends of the arms 15 of the guard hooks, whereupon the bar 17 may drop into the space intermediate the latter. The continued inward thrust upon the male element carries the resilient arms 19 into engagement with the posts 11 adjacent to the open end of the female element, the notches or indentations 22 thereof arrive opposite said vertical posts 11, whereupon the tension to which said arms 19 are subjected causes the same to spring laterally outward to thereupon engage said notches or indentations 22 with said posts 11, thus interlocking the male element with the female element to hold the former against withdrawal from the latter. If by any chance, the notches or indentations 22 should become accidentally disengaged from the posts 11, so that the male element was freed for outward withdrawal, the outward movement of said male element would carry the U-shaped portions 20 under the arms 15 of the guard hooks 14, so that the latter would catch and hold the same, thus arresting further outward movement of the male element and thereby preventing complete separation of the same from the female element, this action being illustrated by the dotted lines in Figure 2 of the drawings. When it is desired to separate the male element from the female element, the finger-pieces 21 at the free ends of the arms 19 of the male element (which finger-pieces project beyond the sides of the female element) are engaged and pressed inwardly to disengage the notches or indentations from the posts 11, whereupon the male element may be withdrawn outwardly through the open end of the female element when the former is raised upwardly against the inner side of the front or face plate 9 to aline the U-shaped portions 20 for passage through the way or passage 16 intermediate the guard hooks 14 and the front or face plate 9.

Referring now to Figures 7 and 8 of the drawings I have shown that the male element may be slightly modified by forming in the bar 17 an upwardly bowed portion or spring hump 23, which, when the free end of the male element passes over the guard hooks 14, will engage the under side of the front or face plate 9, with a tendency to thrust and hold downwardly upon the bottom plate 10 the fully entered male element, so that the U-shaped portions 20 are alined opposite the guard hooks 14.

In the types of clasps above described, the male element provides for a double grip or interlock with opposite posts 11 of the female element by reason of the notched arms 19 being provided on each side of the bar 17, and, furthermore, since the bar 17, when fully inserted, is engaged between the hook members 14 the male member as a whole is firmly held against lateral canting or shifting, thus reducing the likelihood of accidental separation of the notched arms 19 from operative interlocked engagement with said posts 11.

Referring now to Figures 5 and 6 of the drawings, I have shown therein a modification of my novel clasp or fastener which nevertheless, embodies the essential features and principles of my present invention. In this type of construction the female element comprises the front or face-plate 9' and back plate 10' connected together at their sides by the posts 11' and at their rear end by the end post 12' carrying the link 13' all forming the box-like structure open at its forward end. Disposed centrally in the open end of said female element to spring from the back-plate 10' is a single hook-member 14' having the inwardly directed arm 15', between which and said face or front plate 9' is the unobstructed way or passage 16'. The male element comprises a substantially V-shaped member consisting of two laterally resilient arms 24 and 25 which diverge laterally from their joined forward ends, thus providing a U-shaped portion 26 at said joined forward ends. Each arm is provided at the rearward or outer free end thereof with an outwardly turned finger-piece 27, and one of said arms, as 25, is provided with a notch or indentation 28 to cooperate with a post 11' adjacent the open end of said female element, and the other arm, as 24, is provided with an eye-portion or ring 29 to receive the attachment of one end of the necklace, chain, bracelet or the like to be served by the clasp or fastener. As will be apparent from an inspection of Figure 6 of the drawing, the male element may be directly thrust longitudinally into the female element, by passing the U-shaped portion 26 into and through the way or passage 16' above the guard hook 14' and its arm 15', after which the male element will drop down upon the back plate 10' so that its arms 24 and 25 will straddle the guard-hook 14'. When thrust all the way in the male element will be interlocked with the female element by the engagement of the notch or indentation 28 of the arm 25 with a post 11', the stored tension of the arms 25 and 24 tending to cause divergence thereof maintaining such cooperation. If by any chance, the indentation or notch 28 should become accidentally disengaged from the post 11' and outward movement of the male element ensue, such outward movement would be arrested by the passing of the U-shaped portion 26 into engagement with the hook-portion 14'. It will thus be apparent that the modified structure involves the same mode of operation and the same general principles of construction already described in connection with the formerly discussed types.

I am aware that some changes may be made in the various arrangements and combinations of the several devices and parts of my invention without departing from the scope of the same as above described, and as defined in the appended claims. Hence, I do not limit my invention to exact arrangements and combinations as described in the foregoing specification, nor do I confine myself to the exact details of the construction of the elements and parts as illustrated in the accompanying drawings.

I claim:—

1. A clasp comprising a box-like body having an open end, a guard-hook device secured to one wall of and located within the open end of said body, a male fastener having closed means at its free end to straddle said guard-hook, mutually cooperative parts on said box-like body and said male fastener for normally interlocking the same together, said guard-hook device being spaced from the opposite wall of said body to provide an unobstructed passage for the direct endwise longitudinal movement of said male fastener into said body.

2. A clasp comprising a female element consisting of a front plate and a back-plate in parallel spaced apart relation, posts interconnecting the longitudinal margins of said plates, means at the rear end of said plates for receiving the attachment of one end of an article to be served by the clasp, inwardly directed hook-like guard means attached to the forward end of one plate and spaced from the opposite plate to provide an unobstructed way leading longitudinally into the space intermediate said plates; a male element having laterally resilient arms joined together at their inner ends and adapted to straddle said hook-like guard means, one of said arms having a notch to interlock with a post adjacent to the forward end of said female element, said male element being adapted to pass endwise through said way above said hook-like guard means and thence into straddled relation to the latter, and means on the outer end of said male element for receiving the attachment of the opposite end of said article to be served by the clasp.

3. A clasp comprising a box-like body having an open end, an inwardly directed guard-hook means disposed within the open end of said body and secured to one wall thereof but spaced from the opposite wall thereof to provide an unobstructed way leading longitudinally into the interior of said body, a fastener having a laterally resilient arm forming a U-shaped juncture with its free end, said resilient arm having a lock-notch on its outer side, and means within the box-like body engageable by said lock-notch to interlock said fastener to said body, said fastener being adapted to pass by direct longitudinal endwise movement through said way above said guard-hook means into said body.

4. A clasp comprising a female element consisting of a front plate and a back plate in parallel spaced apart relation, posts interconnecting the longitudinal margins of said plates, a pair of laterally spaced apart guard hooks having inwardly directed free ends, said guard hooks being secured to one end of said back plate but spaced from said front plate to provide an unobstructed passage leading into the space between said plates; and a male element comprising a central longitudinal bar, laterally resilient arms joined with the free end of said bar to extend back along each side thereof and forming with said bar U-shaped portions engageable with said guard hooks, said resilient arms having in their outer margins notches to engage with certain of said posts to interlock said male element with said female element, outwardly turned finger-pieces at the free ends of said resilient arms adapted to project outwardly beyond the sides of said plates when said male element is interlocked with said female element, and said bar being adapted to drop between said guard hooks when said male element is engaged in said female element.

5. A clasp comprising a female element consisting of a front plate and a back plate in parallel spaced apart relation, posts interconnecting the longitudinal margins of said plates, a pair of laterally spaced apart guard hooks having inwardly directed free ends, said guard hooks being secured to one end of said back plate but spaced from said front plate to provide an unobstructed passage leading into the space between said plates; and a male element comprising a central longitudinal bar, laterally resilient arms joined with the free end of said bar to extend back along each side thereof and forming with said bar U-shaped portions engageable with said guard hooks, said resilient arms having in their outer margins notches to engage with certain of said posts to interlock said male element with said female element, outwardly turned finger-pieces at the free ends of said resilient arms adapted to project outwardly beyond the sides of said plates when said male element is interlocked with said female element, said bar being adapted to drop between said guard hooks when said male element is engaged in said female element, and said bar having an upwardly bowed yieldable portion intermediate its ends for engagement with said front plate when said male element is inserted in said female element.

In testimony that I claim the invention set forth above I have hereunto set my hand this 28th day of November, 1922.

EDWARD C. GRASSMAN.

Witnesses:
GEORGE D. RICHARDS,
MARCUS A. FOX.